United States Patent [19]

Huang et al.

[11] Patent Number: 5,006,261

[45] Date of Patent: *Apr. 9, 1991

[54] PAINT DETACKIFICATION USING WATER-DISPERSIBLE POLYMERIC LATEXES

[75] Inventors: Shu-Jen W. Huang; Claudia V. Stenger, both of Naperville, Ill.

[73] Assignee: Nalco Chemical Company, Naperville, Ill.

[ * ] Notice: The portion of the term of this patent subsequent to Jun. 28, 2007 has been disclaimed.

[21] Appl. No.: 507,549

[22] Filed: Apr. 11, 1990

Related U.S. Application Data

[63] Continuation-in-part of Ser. No. 287,210, Dec. 21, 1988, abandoned.

[51] Int. Cl.$^5$ .............................................. C02F 1/56
[52] U.S. Cl. ..................................... 210/712; 55/85; 210/728; 210/732; 210/733; 210/930
[58] Field of Search ...................... 55/84, 85; 210/712, 210/725, 727, 728, 732–734; 134/38

[56] References Cited

U.S. PATENT DOCUMENTS

| Re. 28,807 | 5/1976 | Panzer et al. | 210/736 |
| 3,485,752 | 12/1969 | Eck | 210/732 |
| 3,493,501 | 2/1970 | Eck | 210/732 |
| 3,515,575 | 6/1970 | Arnold | 55/84 |
| 4,656,059 | 4/1987 | Mizuno et al. | 210/729 |
| 4,753,738 | 6/1988 | Huang | 210/734 |
| 4,764,561 | 8/1988 | Kiss et al. | 55/85 |
| 4,792,364 | 12/1988 | Huang | 210/738 |

FOREIGN PATENT DOCUMENTS 731212 3/1966 Canada .

OTHER PUBLICATIONS

*Kirk-Othmer Encyclopedia of Chemical Technology* 3rd Edition, vol. 23, John Wiley & Sons, 1983.

Primary Examiner—Peter Hruskoci
Attorney, Agent, or Firm—John S. Roberts, Jr.; Robert A. Miller; Donald G. Epple

[57] ABSTRACT

Water-dispersible polymeric latexes are excellent paint detackifying agents for treating the circulating water in paint spray booths when latexes have an average particle size less than 10 microns.

3 Claims, 1 Drawing Sheet

LAB SCALE SPRAY RECIRCULATION TEST EQUIPMENT

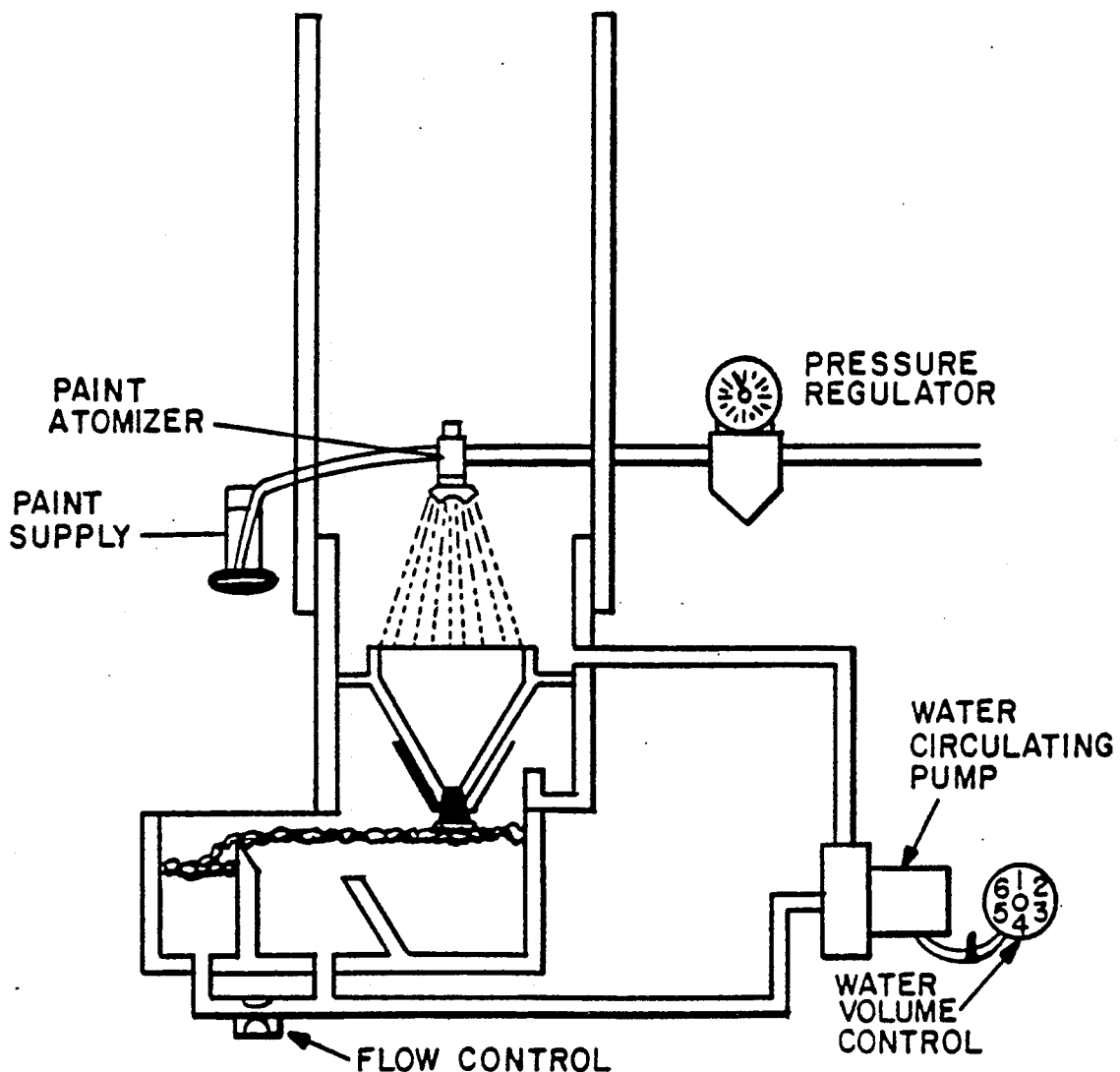

PAINT DETACKIFICATION USING WATER-DISPERSIBLE POLYMERIC LATEXES

CROSS REFERENCE OF RELATED CASE

This application is a continuation-in-part of pending Ser. No. 07/287,210 filed Dec. 21, 1988 now abandoned.

INTRODUCTION

This invention relates to a method for the treatment of wet spray booths by the use of small particle size water-dispersible polymeric latexes which diminishes the tackiness of coating material entrained in the circulating water which is sprayed for collecting surplus paint. The invention precludes the coating material from adhering fast to the interior surfaces of the circulating water systems.

Generally in automotive coating process, the yield of the paint applied to an automobile body ranges from 50 to 80%. The remaining 50 to 20% of the used paint constitutes an excess to be removed. The automobile body is spray painted. Over-sprayed paint is collected in a water spray. This water containing the over-sprayed paint is circulated for re-use.

In wet spray booths constructed as described above, the surplus paint which is collected in the washing water is tacky. It adheres to the water-film panel, the piping system, the spray nozzle, etc. of the spray booth, clogs the piping system and the nozzle, and seriously degrades the efficiency of water washing. Further, when the surplus paint so deposited clogs the waste gas discharge system and interferes with the flow air in the spray booth, the vapor of the solvent of the paint fills up the interior of the booth to produce a state dangerous to safety and hygiene. Also, the greater part of the surplus paint settles to the bottom of the booth and the circulation pit in the spray booth. This sediment of paint so formed hardens into a rubbery mass with elapse of time. The removal of this hardened mass and the cleaning of the bottoms take up much time and labor.

The paint collected in the washing water not merely undergoes adhesion or sedimentation within the system but also dissolves into components or disperses into fine particles. An increase in dissolved solids accelerates the progress of corrosion inside the system. The solvent in the paint increases the hydrocarbon content of the waste gas from the booth and also dissolves into the cleaning water and increases the COD (chemical oxygen demand) of the water being circulated. The solvent of the paint, depending on the kind thereof, acidifies the circulating water and consequently accelerates the corrosion of the system.

PRIOR ART

In U.S. Pat. No. 4,764,561 there is described a paint spray booth detackifying composition which includes mixtures of styrene-acrylate polymer and a melamine-formaldehyde polymer and the method of using same.

THE FIGURE

The figure shows a laboratory test apparatus used to evaluate the invention.

THE INVENTION

The invention comprises a method for the treatment of the circulating water which collects surplus paint in a paint spray booth which comprises treating this water with a paint detackifying agent comprising a water-dispersible polymeric latex having a dry average particle size less than 10 microns. These latexes are particularly effective in detackifying low solids enamels, e.g., 35% by weight solids or less. When these latexes are used to treat high solids enamels, base coat or clear coat enamels, they are advantageously used in combination with water-soluble or dispersible coagulants.

WATER-DISPERSIBLE POLYMERIC LATEXES

The water-dispersible polymeric latexes may be selected from a large number of polymeric emulsions of water-dispersible polymers.

Exemplary are the polyvinyl acetals which commercially have molecular weights ranging from as little as 10,000 to as high as about 50,000. Typical commercial polyvinyl acetals are the polyvinyl formals.

Polyvinyl acetate is another water-dispersible polymer which in latex form may be employed in the invention. In addition to its homopolymers, its copolymers formed from the following monomers may also be used: acrylic acid, acrylonitrile, chloroprene, diallyl phthalate, diethyl fumarate, ethylene, ethyl vinyl ether, isobutyl methacrylate, isopropenyl acetate, maleic anhydride, styrene, vinyl chloride, and N-vinylpyrrolidinone.

Another useful latex is polyvinyl chloride. Also useful are the various vinyl ether latexes such as the methyl and ethyl vinyl ether latexes. A list of typical vinyl ethers that may be polymerized to produce useful latexes are those set forth below in Table I.

TABLE I

CH$_3$CH$_2$OCH=CH$_2$
(CH$_3$)$_3$COCH=CH$_2$
(CH$_3$)$_2$CHOCH=CH$_2$
ClCH$_2$CH$_2$OCH=CH$_2$
aryl vinyl ethers

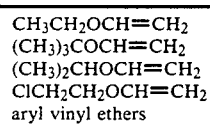

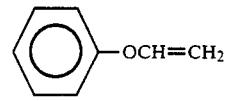

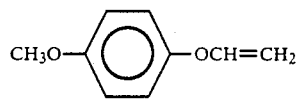

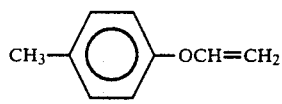

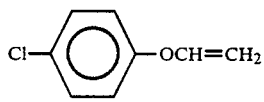

A group of preferred polymers are those of styrene and its copolymers, particularly the copolymers of styrene with butadiene and acrylate esters, e.g., methyl acrylate and ethyl acrylate.

Another preferred group of polymers are the acrylate esters and their copolymers. Typical acrylate esters are the methyl and ethyl acrylates.

For a more detailed description of latexes of the above type, reference may be had to *Kirk-Othmer, Encyclopedia of Chemical Technology*, Third Edition, Vol.

23, John Wiley & Sons, Inc., 1983, which is incorporated herein by reference.

Particle Size and Concentration of the Water-Dispersible Polymeric Latexes

A critical feature of the invention resides in the fact that the dry particle size of the water-dispersible polymeric latex must be small, e.g., 10 microns or less. In a preferred embodiment, the average particle size is 5 microns or less with a most preferred particle size range being 1 micron or less. The amount of the active polymers in the latex should be at least 200 ppm. Good results are achieved using latexes having polymer concentrations 200–400 ppm.

The Water-Soluble Coagulants These well-known compounds may be either inorganic, polymeric or blends of inorganic and polymeric flocculants. In certain instances, certain cationic surfactants such as fatty substituted amines or fatty substituted quaternary polymers function as coagulants. Typical of the coagulants that may be used are those described in Cocks, Canadian Patent 731,212, which is incorporated herein by reference.

Other useful coagulants are the quaternary ammonium salt polymers formed by reacting epichlorohydrin with diethyl amine. This technology is described in Panzer, et al, U.S. Pat No. Re 28,807, which is incorporated herein by reference. A preferred coagulant is the melamineformaldehyde resin described in U.S. Pat No. 4,764,561.

When the coagulants are used in conjunction with water-dispersible polymeric latex, the mixture may have a mole ratio ranging from 20:1 to 1:20. This ratio will depend on the particular combination of coagulant and latex used and the composition of the paint treated.

Dosage

The amount of water-dispersible polymeric latex product which contains the water-dispersible polymer used to produce paint detackification may vary between as little as 1 to as much as 5,000 ppm. A typical dosage is within the range of 40 to 600 ppm. Dosage is based upon the weight of the circulating water used to collect the surplus paint. When the water-dispersible polymeric latexes are combined with the water-soluble coagulants, a useful dosage of such products is also between 40–600 ppm.

Evaluation of the Invention

EXAMPLE 1

In this laboratory test using the test apparatus shown in the figure, desired amounts of detackifiers are added to the water manually or using a chemical pump to monitor the chemical demand. These detackifiers are allowed to mix in the tank through water recirculation for 5 minutes. The paint being tested is then sprayed into the chamber at a rate of 2 ml/min. through an air atomized spray gun located 12 inches above the center of the scrubbing section. The test paint is sprayed for 5 minutes, then the paint kill is tested for tackiness or stickiness. The testor wets his hand with the water solution in the test tank, then takes a sample of the floating paint sludge from the water tank, squeezes, and rubs tightly between his fingers. Any tackiness or stickiness present is a poor paint kill. A chart for degree of paint kill is provided below to assure consistent description.

A minimum degree of kill of 6 is required to assure booth cleanliness.

At the conclusion of a good paint kill, paint is continuously sprayed, and the paint sludge conditions tested every few minutes. At any given time, if any trace of tackiness of sludge is present, paint spray should be discontinued and the program re-examined. The amount of paint sprayed should be recorded, and the chemical dosage and condition of sludge.

Additionally chemicals should be added and paint spray resumed. Repeat this process at least four times.

| Chart for Degree of Paint Kill | | |
|---|---|---|
| 10 | Perfect | Complete kill, sludge is soupy |
| 9 | Excellent | Paint sludge is non-tacky, non-gritty |
| 8 | Very Good | Paint sludge is not tacky or gritty, but slightly plastic, may roll |
| 7 | Good | Not tacky, plastic consistency, sludge rolls and can easily reroll |
| 6 | OK | Minimum performance, very slightly tacky; rolls with water and reroll; can wash off without rubbing |
| 5 | Borderline | May stick slightly to glove but falls off with rubbing |
| 4 | Unacceptable | Slight tacky, sticks to glove with pressure, does not rub off, may roll |
| 3 | Moderate failure | Does not roll, sticks to glove, smears |
| 2 | Severe failure | Tacky, smears |
| 1 | Very sticky | Smears |
| 0 | Like raw paint | |

The invention was evaluated and the results obtained are as follows:

TABLE II

| Latex No. | Water-insoluble Polymeric Latex Tested |
|---|---|
| 1 | An acrylate-vinyl acetate-vinyl chloride polymer Particle size: 0.6μ Supplied by Union Carbide |
| 2 | A vinyl acetate polymer Particle size: 0.5μ Supplied by National Starch |
| 3 | A styrene-acrylate polymer Particle size: 0.5μ Supplied by Rohm & Haas |
| 4 | A styrene-acrylate polymer Particle size: 0.06–0.09μ Supplied by Emulsion System M. W. 100,000–150,000 |
| 5 | A styrene-butadiene polymer Supplied by B. F. Goodrich |
| 6 | A styrene-acrylate polymer Particle size: 0.5μ Supplied by Emulsion System M. W. 50,000–100,000 |
| 7 | A styrene-acrylate-acrylamide polymer Particle size: 0.5μ Supplied by Emulsion System |
| 8 | A styrene-acrylate polymer Particle size: 0.5μ Supplied by Essential Chemicals |
| 9 | (RWL-112) - polystyrene latex polymer Particle size: 0.3μ Supplied by Morton Thiokol |

Latexes were tested alone at pH 9–10 as a single detackifier. When high concentration latex (i.e., 5,000 ppm–10,000 ppm) was used or when a lower solids enamel paint (lower than 35% solids) and lacquer paint were used, the above latexes gave a good detackification property.

Latexes where also tested with a variety of coagulants. These compositions are shown in Table IV.

However, when a high-solid enamel or base coat/clear coat enamel paint was used, additional coagulants had to be used in conjunction with the latex to obtain an acceptable paint kill.

For more quantitative test results, the pilot recirculator test was then used.

Several coagulants were tested in combination with the latexes. Table III shows the coagulants used in the test.

TABLE III

| | Coagulant No. |
| --- | --- |
| 1 | Poly aluminum chloride + epi-DMA |
| 2 | EDC/NH$_2$ CH$_3$Cl quaternary |
| 3 | TEA quat./Alum |
| 4 | Aniline formaldehyde |
| 5 | EPI/DMA-NH$_3$ crosslinked |
| 6 | EDC/NH$_3$/NaOH |
| 7 | Ditallow dimethyl ammonium chloride |
| 8 | Calcium chloride |
| 9 | Melamine formaldehyde |
| 10 | Clay/polyamine |
| 11 | Poly aluminum chloride |
| 12 | Rohm & Haas XE-492 |

The results of the tests using the latexes with the coagulants are set forth below in Table IV.

TABLE IV

| Latex No. | Coagulant No. | Ratio of Latex:Coagulant | Results |
| --- | --- | --- | --- |
| 9 | 6 | 4.5:1 | Kill 3 |
| 9 | 2 | 6.0:1 | Kill 3 |
| 9 | 11 | 1.7:1 | Kill 5 |
| 9 | 8 + 11 | 1.0:1 | Kill 6 |
| 9 | 9 | 1.0:9 | Kill 7 |
| 6 | 11 | 1.0:3 | Kill 5 |
| 6 | 2 | 5.0:1 | Kill 3 |
| 6 | 4 | 1.7:1 | Kill 4 |
| 6 | 8 | 0.3:1 | Kill 2 |
| 6 | 1 | 1.0:1 | Kill 7 |
| 6 | 7 | 2.5:1 | Kill 2 |
| 6 | 5 | 5.0:1 | Kill 5 |
| 6 | 3 | 1.0:1 | Kill 2 |
| 6 | 9 | 1.0:12 | Kill 8-9 |
| 4 | 12 | 1.0:1 | Kill 4 |
| 4 | 9 | 1.0:1 | Kill 5 |
| 4 | 7 | 1.0:7 | Kill 2 |
| 1 | 4 | 2.6:1 | Kill 5 |
| 1 | 9 | 2.8:1 | Kill 6 |
| 2 | 9 | 1.0:8 | Kill 5 |
| 2 | 4 | 2.0:1 | Kill 3 |

Note: See the Chart for Degree of Paint Kill.

Having thus described our invention, we claim:

1. A method of treating circulating wash water from a paint spray booth, said wash water containing an over-sprayed portion of an enamel paint which, prior to spraying, has a solids content of 35% by weight or less in order to prevent said over-sprayed paint contained in said wash water from adhering to the interior surfaces of the circulating water system, which method comprises adding to said water a water-dispersible, polymeric latex detackifier selected from the group consisting of polyvinyl acetate, copolymers of vinyl acetate, polyvinyl chlorides, polystyrene and copolymers of styrene, said latex detackifier having an average particle size of less than 10 microns and being present in an amount to detackify said over-sprayed paint contained in said wash water.

2. The method of claim 1, wherein the water-dispersible polymeric latex is selected form the group consisting of polyvinyl acetate, copolymers of vinyl acetate, polystyrene and copolymers of styrene.

3. A method of treating circulating wash water from a paint spray booth, said wash water containing an over-sprayed portion of an enamel paint, which, prior to spraying, has a solids content greater than 35% by weight in order to prevent said over-sprayed paint contained in said wash water from adhering to the interior surfaces of the circulating water system, which method comprises adding to said water (a) a water-dispersible, polymeric styrene-acrylate latex having an average particle size of less than 10 microns and (b) a melamine-formaldehyde coagulant, said latex detackifier and coagulant being present in an amount to detackify said over-sprayed paint contained in said wash water.

* * * * *